Sept. 25, 1956  L. J. LOVISEK  2,764,053
SELF-COUNTERSINKING SCREW HAVING HEAD
WITH ARCUATELY CURVED UNDERSURFACE
Filed Jan. 5, 1954

INVENTOR
L. J. Lovisek
BY Robbr t Cobb
ATTORNEYS.

United States Patent Office 2,764,053
Patented Sept. 25, 1956

2,764,053

SELF-COUNTERSINKING SCREW HAVING HEAD WITH ARCUATELY CURVED UNDERSURFACE

Louis J. Lovisek, New York, N. Y., assignor to General American Transportation Corporation, Chicago, Ill., a corporation of New York Application January 5, 1954, Serial No. 402,239

2 Claims. (Cl. 85—43)

The present invention relates to screws, and specifically to an improved screw head of the self-countersinking type.

Heretofore, self-countersinking screw heads have been provided by merely extending the conventional driver-receiving slot in the head of the screw down to the threaded shank of the screw. However, in the use of such self-countersinking screw heads, it is found that the edge formed at the juncture of one side wall of the slot with the under surface of the head does not have a very good cutting action or shearing action, but instead, this edge merely scrapes or tears off particles of material into which the screw is being driven, and these particles tend to clog the hole and obstruct driving the screw. Therefore, the torque required to drive this prior type of screw is such that the head is usually subject to easy breakage.

In an effort to relieve the resistance to turning of the screw, certain prior art screws have been provided with a relief clearance for the leading edge of the slot, i. e., the under side of the screw head adjacent to the leading side of the slot, when the screw is being turned, is indented with respect to the trailing or scraping edge thereof. However, the trailing edge in such a screw head nevertheless still merely scrapes or breaks off bits of material, since the cutting action of the screw head is not improved by the mere provision of relief for the leading edge as aforesaid.

Accordingly, it is a primary object of the present invention to provide a self-countersinking screw head which obviates the objections to these prior devices.

This objective is attained by so constructing the self-countersinking screw head that the trailing edge of the screw driver slot has a shearing action upon the material into which the screw is being driven, whether this material be wood, metal, or other material capable of plastic flow or compression.

Pursuant to the aforesaid primary objective, an object of the invention is to provide a self-countersinking screw head which will effect a compound compression beneath the screw head of the material into which the screw is being driven, namely, an axial compression, occasioned by the axial movement of the screw, combined with a lateral compression, occasioned by the improved form of the screw head and the relative depth of the screw driver slot therein.

Specifically, an object of the invention is to provide a self-countersinking screw head having an arcuate under side merging with the screw shank on a radius, the bottom of the slot in the head merging at an intermediate point with the arcuate under side of the screw head, whereby the length of the bottom of the slot is greater than the shank diameter or the root diameter of the screw.

A further object is to provide a self-countersinking screw head, as aforesaid, having the bottom surface of the head unrelieved at the leading edge of the slot, whereby said leading edge will interlock with the material into which the screw has been driven to preclude the screw from backing out due to vibration, but said leading edge being adapted to shear off the material with which it is engaged to allow the screw to be removed.

Other objects and advantages of the invention will be hereinafter described or will become apparent to those skilled in the art, and the novel features thereof will be defined in the appended claims.

In the drawing.

Like reference characters in the several views of the drawing and in the following description designate corresponding parts.

Figure 1:
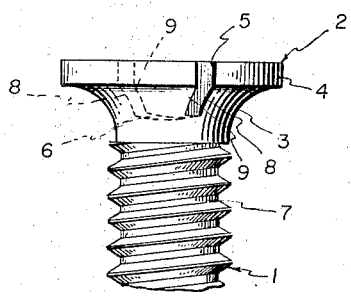
Fig. 1 is a fragmentary view in side elevation of a screw having thereon a self-countersinking head formed according to my invention.

In the drawing, there is shown a screw having a threaded shank 1, the threads shown being of a conventional form and being illustrated only as one type of screw which may embody the present invention. At the upper end of the shank 1 is a self-countersinking screw head, generally designated 2, which is of novel form, and which has certain peculiar advantages which will hereinafter be more particularly described.

The head 2 is formed with an arcuate under side 3 which joins the shank 1 of the screw on a radius, this radius preferably being sufficiently short as to form a rather abrupt turn in the under surface of the screw head.

Thus, the under portion of the screw head flares outwardly from the point of its junction with the screw shank 1, and above the flared portion of the screw head, it is preferably provided with a disc-like portion 4. The portion 4 of the screw head 2 has for its primary purpose to reenforce the flared end portion 3 and to provide a good bite for a screw driver in a slot 5 which extends diametrically across the screw head.

Figure 2:
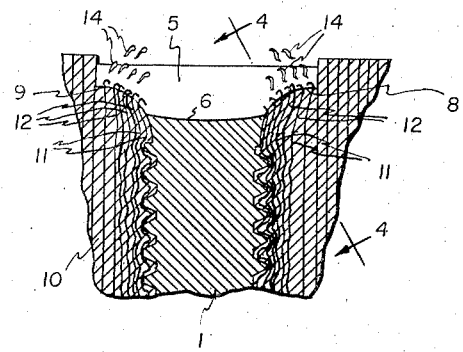
Fig. 2 is a view in vertical section of the screw of Fig. 1, taken through the slot in the screw head, and showing the screw in the act of being countersunk in a body of compressible material.
Figure 3:
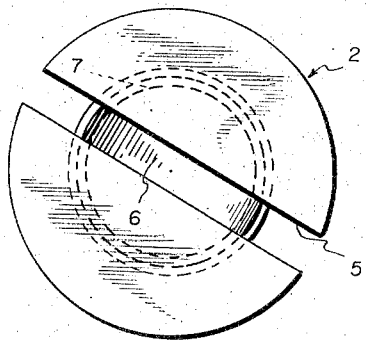
Fig. 3 is a view of the screw of Fig. 1 in top plan and on an enlarged scale.

As is best seen in Figs. 1 and 2, the slot 5 extends only partially down into the upwardly flared head portion 3, so that the bottom of the slot is of a length greater than the diameter at the root 7 of the thread on the screw shank 1, as is clearly seen in Fig. 3.

An arcuate cutting edge 8 is formed at the point of junction of the arcuate surface 3 with one side wall of the slot 5, this cutting edge being the trailing edge when the screw is being driven clockwise into the material. At the point where the other side wall of the slot 5 joins with the arcuate under surface 3, an edge 9 is formed, this edge 9 constituting a leading edge when the screw is being turned in a clockwise direction. These edges 8 and 9 are provided at both ends of the slot 5, but it should be noted that the cutting edge 8 at one end of the slot is on the opposite side of the slot from the cutting edge 8 at the other end of the slot. In other words, where one side wall of the slot 5 joins with the arcuate under surface on opposite sides of the screw, a cutting edge 8 is provided at one side of the slot, and a trailing edge 9 is provided at the other end of the slot.

In addition, it should be noted that the arcuate surface 3 is unrelieved in the area adjacent to the edges 9, i. e., the arcuate under surface 3 is truly circumferential, being interrupted only by the open ends of the slot 5.

Figure 4:
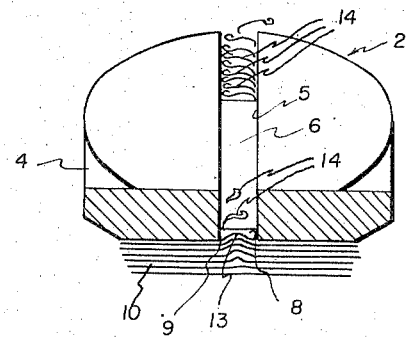
Fig. 4 is a perspective view of the screw on an enlarged scale and having a portion thereof broken away to show the screw in section on the line 4—4 of Fig. 2.

By virtue of the aforementioned specific construction, a substantially improved self-countersinking action is attained by the screw, as is illustrated in Figs. 2 and 4, wherein the screw is shown in the act of being driven into a material, such as wood, metal or the like, which is capable of plastic flow or compression. Referring to Fig. 2, it will be seen that when the screw is being driven, the material into which the screw is being driven, which is designated 10, is compressed in an axial direction by the axial movement of the screw as is diagrammatically represented by the waved compression lines 11. The arcuate under surface 3 of the screw head at the same time produces a radial compression, as indicated by the relative close radial spacing of the compression lines as at 12. As the screw is being turned into the material 10, the material which is compressed will expand or bulge upward as at 13, into the slot 5 (see Fig. 4), and as the cutting edge 9 passes over the projecting material 13, the material will be sheared off, and the release of compression caused by such shearing action will cause the cut off chips to explode or spring up out of the slot, as represented at 14.

The lateral compression aforesaid is effected primarily by that portion of the arcuate under surface 3 which is located between the bottom 6 of the slot 5 and the shank of the screw, since the material engaged by this portion of the screw head is forced to flow laterally in order to be cut by the cutting edges 8. However, the under surface 3 of the head which is intermediate the bottom 6 of the slot 5 and the portion 4 also effects some lateral compression of the material by reason of the head moving axially into the material responsive to rotation of the screw.

When the screw is fully driven into position, the material remains humped in the open ends of the slot 5, as at 13, since the material is still maintained under compression. This hump of material accordingly acts as a stop with which edge 9 at each end of the slot 5 engages to prevent the screw from backing out under vibration loads. However, when a screw driver, or other suitable tool, is used to back the screw out, then edge 9 becomes a cutting edge and will shear off the hump 13, thus allowing the screw to be readily removed.

Thus, it will be seen that I have produced a novel self-countersinking screw head which compresses the material fibers into which the screw is being driven in both an axial and a radial direction and cuts off these compressed fibers, the shearing of the fibers releasing the compression, whereby the sheared off chips will explode themselves out of the slot, with the leading edge of the screw slot acting as to stop for abutting engagement with the humped up material fibers in the screw slot to preclude backing out of the screw under vibration loads, while serving as a cutting edge to shear off such humped material when it is desired to remove the screw.

While the specific details of the invention have been herein shown and described, changes and alterations may be resorted to without departing from the spirit thereof as defined in the appended claims.

I claim:

1. A self-countersinking screw of the class described, comprising a threaded shank, a head on said shank, said head having an arcuate under surface joining the shank, said under surface being circumferentially unrelieved, said head also having a slot therein, said slot opening into the arcuate under surface aforesaid on at least one side of the head and extending therein to a transverse plane where the diameter of the head is substantially equal to crest diameter of the screw threads, and a cutting edge formed at the juncture of one side of said slot with the arcuate under surface aforesaid.

2. A self-countersinking screw of the class described, comprising a threaded shank, a head on said shank, said head having an outwardly flared under surface, said under surface being concavely arched, said head also having a slot therein, said slot having opposed side walls and a bottom, said slot extending diametrically across said head and forming oppositely disposed cutting edges at opposite ends of said slot where the side walls join the under surface of the head, and said slot extending into the head to a transverse plane where the diameter of the head is substantially equal to the crest diameter of the screw threads, with the bottom of said slot intersecting said under surface at a point spaced from said shank.

References Cited in the file of this patent

UNITED STATES PATENTS

| | | |
|---|---|---|
| 296,982 | Low | Apr. 15, 1884 |
| 466,463 | Holland | Jan. 5, 1892 |
| 516,134 | Stilwell | Mar. 6, 1894 |